United States Patent [19]

Ashiya

[11] Patent Number: 5,164,642

[45] Date of Patent: Nov. 17, 1992

[54] CONTROL DEVICE FOR ELECTRIC CAR

[75] Inventor: Masahiro Ashiya, Hyogo, Japan

[73] Assignee: Mitsubishi Denki K.K., Tokyo, Japan

[21] Appl. No.: 740,558

[22] Filed: Aug. 5, 1991

Related U.S. Application Data

[63] Continuation-in-part of Ser. No. 127,541, Oct. 16, 1986, which is a continuation of Ser. No. 766,078, Aug. 15, 1985, abandoned, which is a continuation of Ser. No. 451,651, Dec. 1, 1982, abandoned.

[30] Foreign Application Priority Data

Apr. 1, 1981 [JP] Japan .................. 56-49838

[51] Int. Cl.$^5$ .............................................. H02P 7/29
[52] U.S. Cl. .................... 318/139; 318/293; 318/376; 318/379; 388/804
[58] Field of Search ............. 318/79, 87, 244, 245, 318/139, 368, 371, 375, 376, 379, 381, 493, 293; 388/801, 803, 804

[56] References Cited

U.S. PATENT DOCUMENTS

| | | | |
|---|---|---|---|
| 3,378,746 | 4/1968 | Weiser | 388/805 |
| 3,421,065 | 6/1969 | Stabile | 388/806 |
| 3,435,316 | 3/1969 | Wilkerson | 388/804 |
| 3,564,365 | 2/1971 | Zelina | 318/251 |
| 3,599,064 | 8/1971 | Friedman | 388/804 |
| 3,657,625 | 4/1972 | Miller et al. | 318/370 |
| 3,753,059 | 8/1973 | Berman | 318/139 |
| 3,811,079 | 5/1974 | Tashiro et al. | 388/804 |
| 4,021,712 | 5/1977 | Ishihara et al. | 318/432 |
| 4,027,220 | 5/1977 | Wilkerson | 318/376 |
| 4,099,111 | 7/1978 | Inaba et al. | 388/806 |
| 4,188,569 | 2/1980 | Campbell | 318/375 |
| 4,211,965 | 7/1980 | Toyama et al. | 388/811 |
| 4,322,667 | 4/1982 | Ohba | 318/269 |

FOREIGN PATENT DOCUMENTS 564305 6/1954 Japan .
53-15567 5/1978 Japan .

OTHER PUBLICATIONS

Kitaoka T., et al., "Automatic Variable Field Chopper Control System for Electric Railcars", IEEE Transactions on Industry Applications, vol. 1A-13, No. 1, Jan.-/Feb. 1987, pp. 18-25.
Ernest A. Young, UITP International Metropolitan Railway Committee Meeting—Choppers—, Sep. 1978, pp. 1-28.

*Primary Examiner*—Bentsu Ro
*Attorney, Agent, or Firm*—Sughrue, Mion, Zinn, Macpeak & Seas

[57] ABSTRACT

The invention is a chopper control for electric cars. In the control device, the currents of the armatures A1 and A2 of electric car driving shunt motors connected to a power source L are controlled by first chopper devices CH1 and CH2, the currents, in the forward direction, the field coils SF1 and SF2 of the shunt motors are controlled by a second chopper device FCH1, and the currents, in the reverse direction, of the field coils are controlled by a third chopper coil FCH2.

2 Claims, 3 Drawing Sheets

CONTROL DEVICE FOR ELECTRIC CAR

This is a continuation-in-part of application Ser. No. 07/127,541 filed Oct. 16, 1986, which is a continuation of Ser. No. 06/766,078, filed Aug. 15, 1985, abandoned, which is a continuation of Ser. No. 06/451,651, filed Dec. 1, 1982, abandoned.

BACKGROUND

Application of chopper devices to electric cars is being employed generally. Recently, instead of this application, a system of driving an electric car by using a VVVF inverter and an induction motor has been proposed. Utilization of a chopper and DC motor system having the specific feature of the proposed system also has been desired because of its high reliability. Thus, the conventional chopper is considerably effective in that the maintenance is simple and the resistance loss is small because the contacts thereof have been eliminated, and in that the electric power is economically used because of the effect of regenerative braking; however, the conventional chopper involves problems needing to be solved.

Heretofore, a chopper control device for an electric car generally employs a system in which a field chopper and a DC compound motor are used, or a system in which a chopper and a DC series motor are employed. However, the former is disadvantageous in that, because of the compound motor, during power running operating and during regenerative braking operation the motor has different characteristics because of the cumulative and differential connections with the series field and shunt field. Furthermore, a cam type controller is required because the armature circuit is of the resistance control type. On the other hand, the latter is disadvantageous in that switching means are required for switching between the power running operation and the regenerative braking operation, and for switching forward movement and backward movement, and furthermore the braking operation is unstable during high speed operation because the motor voltage must be lower than the line voltage (or supply voltage) when the regenerative braking operation is effected.

SUMMARY OF THE INVENTION

In the invention, the forward and reverse control operations can be carried out in the field circuit. In the armature circuit, when the armature voltage is lower than the line voltage (or supply voltage), the chopper device connected in series to the armature is controlled thereby to control the armature current during acceleration, and when the armature voltage is substantially equal to or higher than the line voltage, the chopper device in the field circuit is selectively controlled thereby to control the current of the motor or the speed of the electric car. As the unbalance current between the circuits of the motor is balanced by the chopper device in the armature circuit, a shunt motor can be employed for driving the electric car. Owing to the employment of the shunt motor, the forward and backward movements and the power running and regenerative braking operations can be switched by the field circuit. Furthermore, even when the armature voltage is equal to or higher than the line voltage (or supply voltage), the regenerative braking operation can be effectively carried out by the field control.

A shunt motor suffers from a drawback that, when the voltage is varied, the armature current is changed transiently into a large current, as a result of which the rectification is unstable. This drawback can be eliminated by controlling the chopper device which is connected in series to the armature. Furthermore, because of a shunt characteristics as shown in FIG. 2, when the speed is increased by the occurrence of idling, the torque is abruptly decreased and re-adhesion is caused. Thus, the invention has another advantage that the adhesion is high. Moreover, the power running and regenerative braking operations and the forward and backward movements can be switched substantially continuously, and accordingly the response is considerably high and the accuracy is remarkably improved. In addition, the follow-up characteristic as to the operation speed instruction is improved.

BEST MODE FOR CARRYING OUT THE INVENTION

Figure 1:
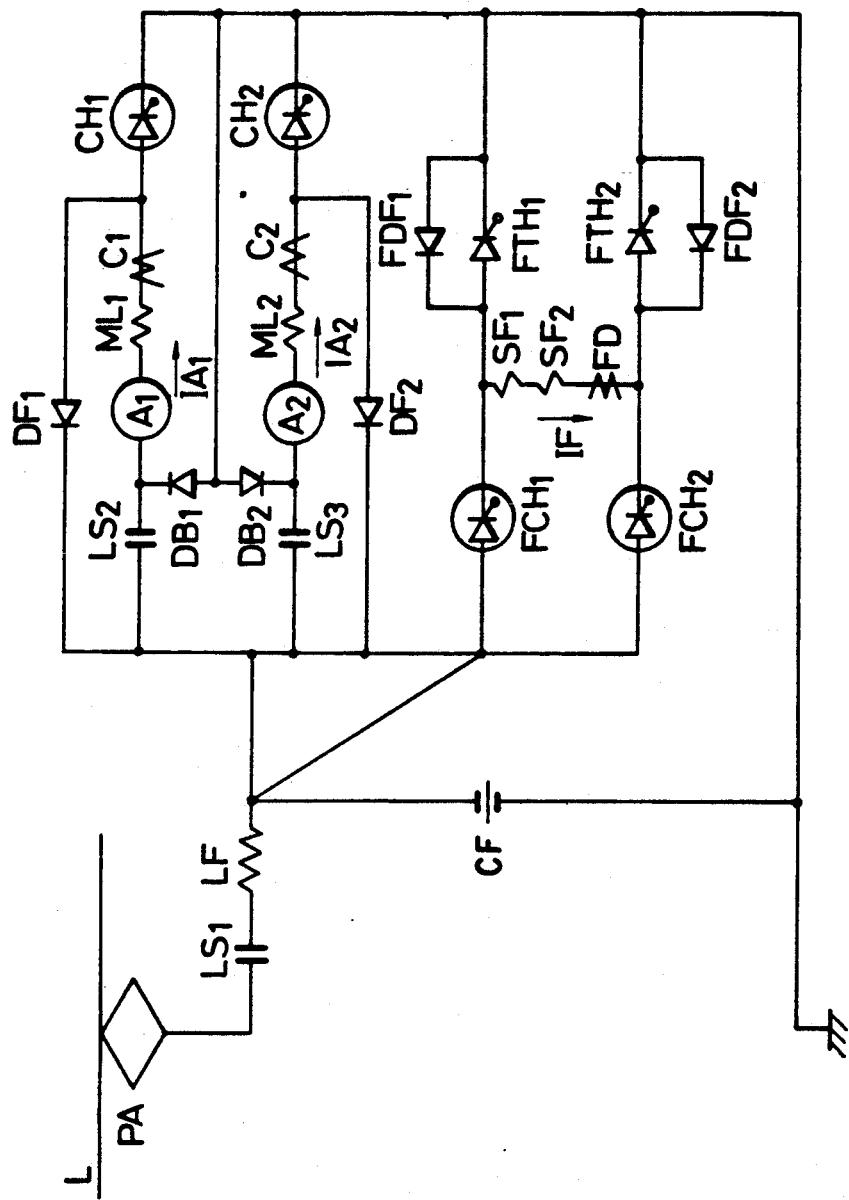
FIG. 1 is a circuit diagram showing one embodiment of this invention.

This invention will be described with reference to the accompanying drawings. In FIG. 1, reference character L designates a line for supplying electric power to an electric car; PA, a pantograph; LS1, LS2 and LS3, line breakers; LF, a filter reactor; CF, a filter capacitor; A1 and A2, first and second shunt motor's armatures; ML1 and ML2, reactors for smoothing motor currents; CH1 and CH2, chopper for controlling the armature circuit of the first and second shunt motors; C1 and C2, current detectors for detecting the current IA1 and IA2 of the armatures A1 and A2; DF1 and DF2, diodes for the chopper devices CH1 and CH2; DB1 and DB2, diodes for permitting armature currents in regenerative braking; SF1 and SF2, the field windings of the first and second shunt motors; FCH1 and FCH2, chopper devices for controlling the currents in the field windings SF1 and F2; FTH1 and FTH2, thyristors; FDF1 and FDF2, diodes; and FD, a current detector for detecting a field current IF.

The operation of the circuit in FIG. 1 is as follows: The main motor uses the shunt motors comprising A1 and SF1, and A2 and SF2. The field current IF supplies current in the forward direction through circuit L-PA-LS1-LF-FCH1-SF1-SF2-FD-FTH2 for instance in the case of power running. When FCH1 is turned off, the field current IF is circulated in a circuit SF1-SF2-FTH2-DFD1. In other words, FCH1-FTH2-FDF1 carries out a chopper action, to control the field current. This operation is similarly carried out when the armature voltage is reversed for backward movement (for instance, when low speed braking is effected for backward movement car. In the case of power running for backward movement, similarly current is supplied in the reverse direction through a circuit FCH2-FD-SF2-SF1-FTH1, and the current is circulated in a circuit SF2-SF1-FTH1-FDF2-FD. This operation is similarly carried out when the armature voltage is reversed for forward movement (for instance when low speed braking is effected for forward movement). On the other hand, in the armature circuit, when an electric car power running current is controlled (the armature voltage being in the forward direction), current is supplied through circuits LS2-A1-ML1-C1-CH1 and LS3-A2-ML2-C2-CH2; and when the chopper devices CH1 and CH2 are off, currents are circulated in circuits A1-ML1-C1-DF1-LS2 and A2-ML2-C2-DF2-LS3.

The armature currents IA1 and IA2 are controlled by turning the copper devices CH1 and CH2 on and off, respectively. In controlling the brake current of the electric car (the armature voltage being reversed in polarity) the line breakers LS2 and LS3 are turned off. When, under this condition, the chopper devices CH1 and CH2 are turned on, currents flow through circuits DB1-A1-ML1-C1-CH1 and DB2-A2-L/ML21-C2-CH2; and when the chopper devices CH1 and CH2 are turned off, currents flow through circuits DB1-A1-ML1-C1-DF1 and DB2-A2-ML2-C2-DF2, whereby the armature currents IA1 and IA2 are controlled by the on-off control of the chopper devices CH1 and CH2.

In the case when the motor voltage is forward in polarity, but it is equal to or higher than the line voltage, the line breakers LS2 and LS3 are maintained in "off" state, and the armature currents IA1 and IA2 flow in the reverse directions through circuits CH1-C1-ML1-A1-LS2 and CH2-C2-ML2-A2-LS3. In this operation, the armature currents IA1 and IA2 are controlled by controlling the armature voltages with the field choppers FCH1 and FCH2.

The operation can be summarized as follows: The current IA1 flowing in the armature A1 is controlled by the chopper CH1. Forward current flow 1F in the field coil SF1 is controlled by the copper FCH1. Reverse current flow 1F in the field coil SF1 is controlled by the chopper FCH2. When a voltage produced by the armature A1 is equal to or higher than the voltage of the power source, the current IF in the field coil SF1 is controlled by the chopper FCH1 so as to increase. As a result, power is fed back to the power source. When the voltage produced by the armature A1 is less than the voltage of the power source, the second chopper FCH1 is turned off while the third chopper is turned on, resulting in a reversal of the voltage produced by the armature A1. Also the chopper CH1 is controlled so power is fed back to the power source through the diode DF.

Figure 2:
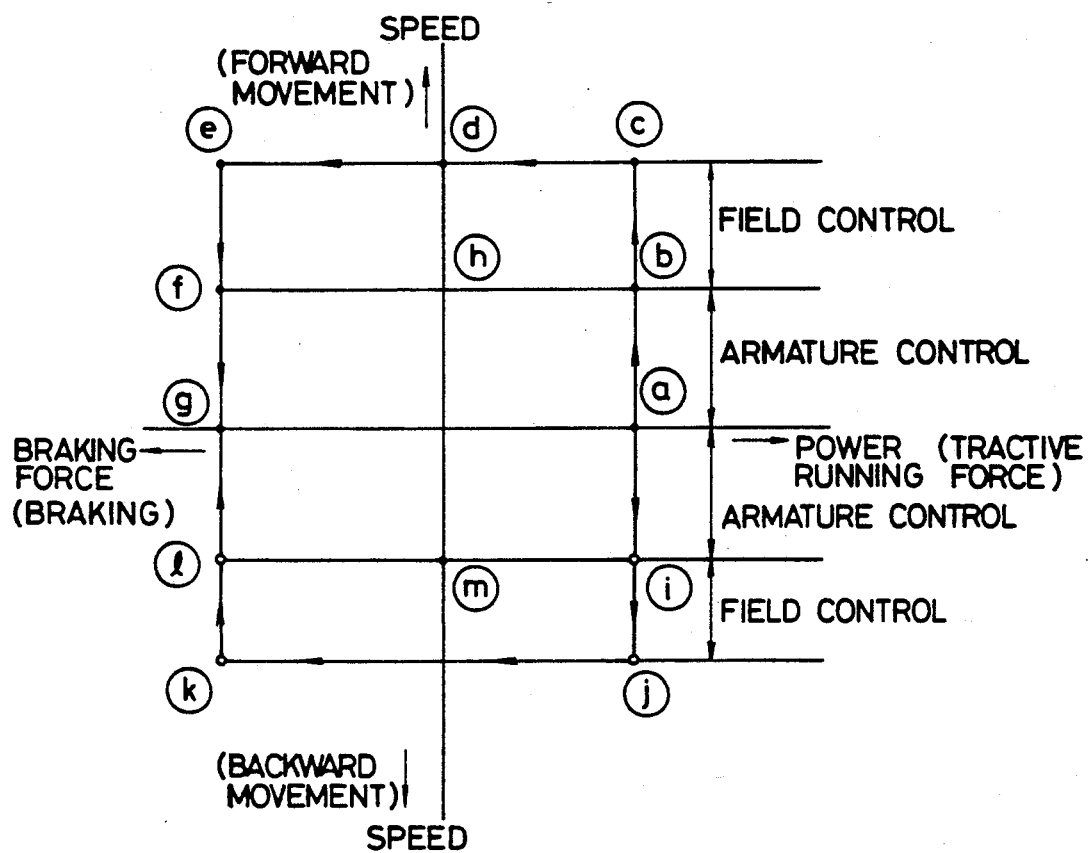
FIG. 2 is a characteristic diagram showing the operation modes of the embodiment in FIG. 1.

FIG. 2 is a characteristic diagram showing the operations of the control device of the invention with respect to the operation modes of the electric car. As shown in FIG. 2, the electric car is operated in four operational modes; a mode of power running for forward movement, a mode of braking during forward movement, a mode of braking during backward movement, and a mode of power running for backward movement. The characteristic diagram shown in FIG. 2 is a two-axes characteristic diagram with tractive forces (braking forces) on the horizontal axis and with speeds (forward and backward) on the vertical axis. The diagram can be divided into four quadrants. According to the invention, control can be effected substantially continuously between the four quadrants.

When the electric car is started, a constant torque control (or a constant acceleration control) is applied. In this operation, the field current is controlled substantially to a predetermined value except when it is in transient state, and the armature currents are so controlled that they are made constant by the copper devices CH1 and CH2 as the armature voltages increase with speed ((a)–(b) in FIG. 2). When the outputs of the chopper device CH1 and CH2 substantially reach the line voltage (the point (b) in FIG. 2), the chopper device CH1 and CH2 merely correct the armature currents IA1 and IA2 (only when required) which are affected by the voltage unbalance between the armatures A1 and A2, and the field current IF is controlled by the operation of the chopper device FCH1; that is, control is effected between the points (b) and (c) in FIG. 2. As an operation speed is specified by the operator, the operation is carried out substantially at a constant speed by control of the field current IF. In this case, in the circuit in FIG. 1, the line breakers, LS1, LS2 and LS3 are turned on, and the diodes DB1, DB2 and FDF2 and the chopper devices are blocked, and therefore the control is effected by the chopper device CH1, CH2 and FCH1. When the electric car running at a constant speed comes to a slope, for instance, sometimes it is necessary to apply a braking current. In this case, the control is changed from that between the operation points (c) and (d) to that between the operation points (d) and (e); that is, the control is successively carried out by increasing the field without switching the circuit. When deceleration is required, it is carried out by the control between the points (e) and (f). In this case, the operation mode of the main circuit in FIG. 1 is maintained unchanged except that the field current is increased. That is, the braking current flows in a circuit CH1-C1-ML1-A1-LS2 in FIG. 1. When the operator specifies stop braking, i.e., he specifies the speed between the points (f) and (g), the operation point comes between the point (f) and (h). therefore, the lines breakers LS2 and LS3 are turned off, and the field chopper device. FCH1 and the device FTH2 are turned off, so that the chopper device FCH2 is operated on and off. The thyristor FTH1 is turned on, to permit the field current to flow in the reverse direction, thereby to reverse the voltages of the armatures A1 and A2. The armature currents IA1 and IA2 are caused to flow in circuits

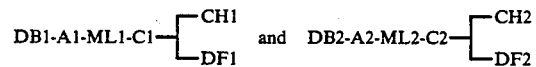

whereby the control between the points (f) and (g) in FIG. 2 is carried out while the same braking current (braking force) being maintained, as a result of which the electric car is stopped. If, immediately before the electric car stops, the chopper devices CH1 and CH2 are short-circuited and the field current IF is controlled to increase the field, then the braking is effective in a lower speed operation.

In the case when the mode of power running for backward movement is specified, the armature circuit operates substantially similarly as in the braking operation in the mode of power running for forward movement except that the field current is controlled by the use of a circuit FCH2-FD-SF2-SF1-FTH1. That is, the operation is effected from the point (a) to the point (i), from the point (i) to the point (j), from the point (j) to the point (k), from the point (k) to the point (l), and from the point (l) to the point (g) (from the point (l) to the point (m). In other words, the power running operation, the constant speed operation, the braking operation and the stopping operation are carried out in the stated order. The forward movement operation and the backward movement operation are different from each other only in that the direction of the field current is reversed in the power running operation and in the braking operation and the armature voltage becomes positive. Therefore, the detailed description will be omitted.

Figure 3:
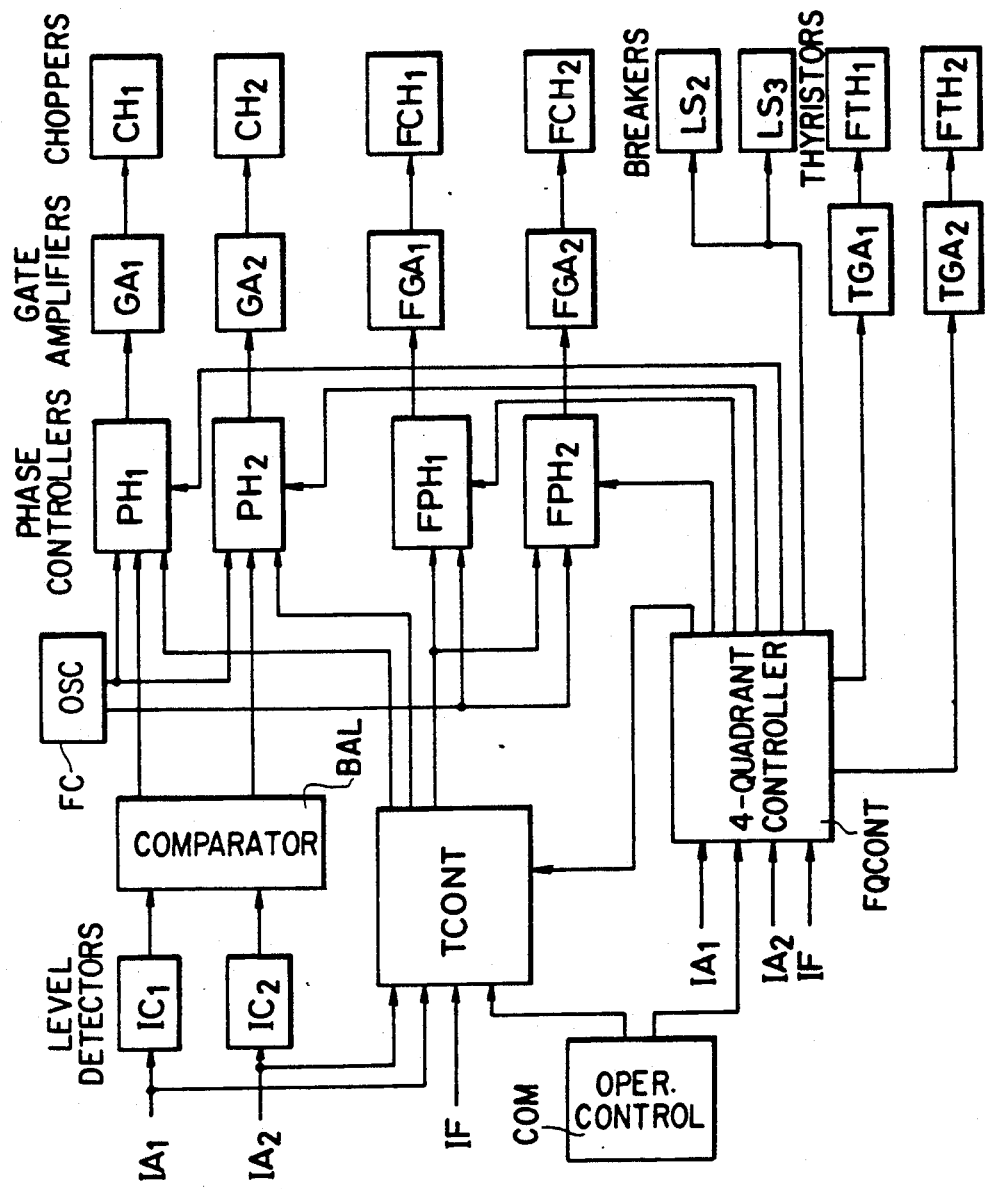
FIG. 3 is a block diagram showing a control circuit in FIG. 1.

FIG. 3 shows one example of a control circuit for controlling the main circuit according to the invention. In FIG. 3, reference character IC1 designates a level converter for the current detection value of the armature A1; IC2, a level converter for the current detection value of the armature A2; BAL, a current controller for detecting the difference between the outputs of the converters IC1 and IC2, to balance the armature currents IA1 and IA2; PH1 and PH2, phase control circuits for controlling the current transmission factors of the chopper devices CH1 and CH2 (FIG. 1) to control the armature currents IA1 and IA2; and TCONT, a torque control device for comparing the detection values of the current detectors C1, C2 and FD with an instructed torque from an operation controller COM or a braking force, to control the torque or the braking force to a value as instructed, the device TCONT applying suitable instructions to the phase controllers PH1, PH2, FPH1 and PFH2. The phase controller FPH1 operates to control the chopper device FCH1 in FIG. 1, to control the magnitude of the field current IF. The phase controller FPH2 operates to control the chopper device FCH2 in FIG. 1, to control the magnitude of the field current IF. The selection of operation is effected according to instructions from a four-quadrant controller FQCONT. The operation controller COM operates to specify torque (or braking force) for the shunt motor according to a specified speed value and an actual speed, and to specify operation modes, for instance, by instructing forward movement and backward movement. The four-quandrant controller FQUCONT operates to select the operations of the circuit elements TCONT, PH1, PH2, EPH1, EPH2, TGA1 AND TAG2 in correspondence to the quadrants in FIG. 2 according to the instructions from the operation controller COM and the actual currents IA1, IA2 and IF, and to apply suitable instructions to those selected. In the circuit in FIG. 3, the controller COM is separated from the controller FQCONT; however, they may be formed as one unit.

Further in FIG. 3, reference characters GA1, GA2, FGA1, FGA2, TGA1 and TGA2 designate gate amplifiers which apply suitable pulse signals to the chopper devices CH1, CH2, FCH1 and FCH2 and the thyristors FTH1 and FTH2; and FC, an oscillator for providing operating frequencies for the chopper devices CH1, CH2, FCH1 and FCH2.

The main circuit as shown in FIG. 1 can be so controlled by the circuit arranged as shown in FIG. 3 as to operate as shown in FIG. 2.

The invention has been described with reference to the case where two shunt motors are provided. In the case also where more than two shunt motors are provided, the same effect can be obtained, if the motors are used for the same purpose. This can be said equally to the case where only one shunt motor is employed.

The same effect can be obtain by replacing the thyristor FTH1 and the diode FDF1 by a compound element made up of thyristors opposite in conduction to each other or by a combination of a transistor and a diode, when they are used for the same purpose.

In the above-described embodiment, the reactors ML1 and ML2 are provided; however, the inductances of the armatures A1 and A2 can provide the same effect without providing the reactors ML1 and ML2.

INDUSTRIAL APPLICABILITY

The invention is applicable to switching the power running operation and the braking operation of an electric case using chopper devices, and to switching forward movement and backward movement thereof.

I claim:

1. A control device for an electric car driving shunt motor having an armature ($A_1$) and a field coil ($SF_1$) driven by a power source (L), comprising:
   a first chopper device ($CH_1$) for passing current flow from said power source to said armature;
   a second chopper device ($FCH_1$) for passing current flow in a forward direction from said power source to said field coil;
   a third chopper device ($FCH_2$) for passing current flow in a reverse direction from said power source to said field coil;
   a diode ($DF_1$) connected between said power source and a point between said armature and said first chopper device;
   means for comparing the voltage across said armature to the voltage of said power source; and
   means for controlling said first, second and third chopper devices, wherein during a deceleration operation:
   when said armature voltage is higher than said power source voltage, said controlling means causes said second chopper device to pass increased current, whereby electric power is fed back to said power source from said armature; and
   when said armature voltage is less than said power source voltage, said controlling means causes said second chopper device to pass substantially zero current, causes said third chopper device to pass current, whereby the voltage produced by said armature is reversed, and caused said first chopper device to pass a controlled amount of current whereby electric power is passed from said armature through said diode to said power source.

2. A control device as recited in claim 1, further comprising:
   a breaker ($LS_2$) connected between said armature and said power source and;
   a diode ($DB_1$) connected between a point between said breaker and said armature and a potential point offset from said power source; and
   wherein said first chopper device is connected to said potential point, said controlling means controls said breaker and opens said breaker during said deceleration operation in which said armature voltage is less than said power source voltage.

* * * * *